(12) United States Patent
Song et al.

(10) Patent No.: US 7,582,332 B2
(45) Date of Patent: Sep. 1, 2009

(54) PARTICLES HAVING CHARGE-CONTROLLING GROUP ON OUTER SURFACE FOR ELECTRONIC-PAPER DISPLAY DEVICE AND METHOD FOR PREPARING THE SAME

(75) Inventors: Moon-Bong Song, Seoul (KR); Soon-Hyung Kwon, Seoul (KR); Sung-Guk Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 488 days.

(21) Appl. No.: 11/276,103

(22) Filed: Feb. 14, 2006

(65) Prior Publication Data

US 2006/0182932 A1 Aug. 17, 2006

(30) Foreign Application Priority Data

Feb. 15, 2005 (KR) .................. 10-2005-0012470

(51) Int. Cl.
*B05D 7/00* (2006.01)
*B32B 5/16* (2006.01)

(52) U.S. Cl. .................... 427/222; 427/402; 427/419.2; 428/403; 428/404

(58) Field of Classification Search ................ 428/403, 428/407, 404; 427/212, 222, 402, 419.2
See application file for complete search history.

(56) References Cited

U.S. PATENT DOCUMENTS

| 4,680,245 A | * | 7/1987 | Suematsu et al. ...... 430/108.21 |
| 4,902,570 A | * | 2/1990 | Heinemann et al. ......... 428/405 |
| 5,900,315 A | * | 5/1999 | Little ......................... 428/405 |

* cited by examiner

*Primary Examiner*—H. (Holly) T Le
(74) *Attorney, Agent, or Firm*—Fish & Richardson P.C.

(57) ABSTRACT

Particles for an electronic paper display device and a method for preparing the same. Since charged particles have a constant electrification amount, a moving speed and a moving amount of the charged particles are uniformly controlled at the time of an electrophoresis. Also, a response speed and a resolution of an electronic paper display device are improved, and an amount of a voltage applied to the electronic paper display device is precisely controlled.

13 Claims, 2 Drawing Sheets

PARTICLES HAVING CHARGE-CONTROLLING GROUP ON OUTER SURFACE FOR ELECTRONIC-PAPER DISPLAY DEVICE AND METHOD FOR PREPARING THE SAME

CROSS-REFERENCE TO RELATED APPLICATIONS

This application claims priority under 35 U.S.C. § 119 to Korean Patent Application No. 2005-12470, filed in Korea on Feb. 15, 2005, the entirety of which is hereby incorporated by reference.

BACKGROUND

The present invention relates to particles for an electronic-paper display device and a method for preparing the same.

As information technology rapidly develops and information visualization is required, each kind of display devices for replacing the conventional cathode ray tube (CRT) display device is being developed. The display devices are being developed to be thinner and lighter and to have a larger screen.

As the display devices, there are a liquid crystal display device, a plasma display device, an organic electroluminescent display device, a field emission display device, an electronic paper display device, etc.

Among the display devices, the electronic paper display device refers to a liquid crystal display device for providing a user a thin and flexible feeling like paper, in which charged particles are moved and rotated by applying a voltage to upper and lower substrates. The electronic paper display device is being spotlighted since it can provide a clear image with less driving power for a long time when compared with other display device.

The electronic paper display device uses an electrophoresis principle by which a conductive material has kinetic energy by receiving an electromagnetic field. More concretely, charged particles float in a certain space between two substrates that are flexible and thin, and each polarity of the charged particles is changed thereby to arrange the charged particles in a certain direction.

Fluid having the same density as the charged particles is filled in the space where the charged particles float, that is, inside a pixel. Accordingly, the charged particles electrophoresed in a certain direction by the polarity change thereof are scarcely influenced by gravity. Therefore, the charged particles electrophoresed in a certain direction are maintained as it is even if power is cut off. That is, an image displayed on a display device is maintained by a memory effect, thereby obtaining a similar effect to an effect that ink is printed on a paper. The displayed image is maintained for a long time unless it is reset by a controller, so that it has a low consumption power and can be utilized as a portable display device.

The conventional electronic paper display device is shown in FIG. 1.

In the conventional electronic paper display device 10, a partition 14 is positioned between an upper substrate 12 where a transparent electrode 13 is formed and a lower substrate 11 thereby to form a plurality of cells (pixels). Negatively-charged particles 15A and positively-charged particles 15B are positioned in the pixels formed by the partition 14, and float by the fluid 16 having the same density as the particles 15A and 15B. The lower substrate 11 and the upper substrate 12 have a thin thickness of several tens to several hundreds of μm, and the particles 15A and 15B electrophoresed between the lower substrate 11 and the upper substrate 12 have a very small size. The transparent electrode 13 has a thickness much thinner than that of the upper and lower substrates 11 and 12.

An operation of the conventional electronic-paper display device 10 will be explained. When different voltages (−, +) are applied to upper and lower portions of the pixels where the negatively-charged particles 15A and the positively-charged particles 15B float, that is, the transparent electrode of the upper substrate and the transparent electrode of the lower substrate, the negatively-charged particles 15A are electrophoresed in a positive electrode direction and the positively-charged particles 15B are electrophoresed in a negative electrode direction. Under an assumption that the negatively-charged particles 15A and the positively-charged particles 15B are colored with different colors (for instance, black and white), a certain image is displayed by the color difference between the charged particles 15A and 15B electrophoresed in different directions by voltages (−, +) applied to the transparent electrode 13.

In the conventional electronic paper display device, a mobility characteristic and a uniform electrification capacity of the charged particles by an electrophoresis have to be obtained, and a charged state of the particles has to be maintained.

As shown in FIG. 2, the particles 150 used in the conventional electronic paper display device are composed of a high molecule resin 151, a colorant 152, and a charge controlling material 153. Also, an external additional material 154 is coated on the surface of the charged particles 150 in order to obtain an electrophoresis characteristic, etc.

In the particles 15A and 15B, a position of the chare controlling material 153 included in the high molecule resin 151 is important.

When the charged particles 15A and 15B are electrophoresed, a moving speed and a moving amount of the charged particles 15A and 15B are determined by an electrification capacity thereof, and the electrification capacity of the charged particles 15A and 15B is determined by an amount of the charge controlling material 153 positioned near the surface of the particles 15A and 15B. That is, a response speed, a resolution, etc. of the electronic paper display device are more influenced by the charge controlling material 153 positioned near the surface of the particles rather than the charge controlling material 153 positioned inside the particles 15A and 15B.

Since the particles 15A and 15B are formed as fine grain, it is almost impossible to evenly distribute the charge controlling material 153. That is, according to the conventional method, it is impossible to implement the most preferable position of the charge controlling material 153, that is, the position on the surface of the particles 15A and 15B rather than inside the particles 15A and 15B. Since the charge controlling material 153 is unevenly distributed in the particles 15A and 15B, or masses at a deep portion of the particles 15A and 15B, the amount of the charge controlling material 153 to be added at the time of preparing the particles 15A and 15B is not proportional to the electrification capacity of the particles 15A and 15B. That is, the electrification amount of the charged particles 150 is irregular thereby to have a difficulty in controlling an amount of a voltage to be inputted to the electronic paper display device.

In order to solve the problem, a voltage to be applied to the display device has to be increased. However, when a higher voltage is applied to the display device, technical advantages of the electronic paper display device are lost.

BRIEF DESCRIPTION OF THE INVENTION

An object of the present invention is to provide particles for an electronic paper display device capable of uniformly controlling a moving speed and a moving amount of charged particles at the time of an electrophoresis.

Another object of the present invention is to provide a method for preparing particles for an electronic paper display device, in which charged particles have a constant electrification capacity.

Still another object of the present invention is to provide a method for preparing particles for an electronic paper display device capable of improving a response speed and a resolution of an electronic paper display device and easily controlling the response speed and the resolution.

Yet still another object of the present invention is to provide a method for preparing particles for an electronic paper display device capable of precisely controlling an amount of power to be applied to an electronic paper display device by maintaining a uniform charged state of particles.

To achieve the objects, a charge controlling means is applied to an outer periphery or an entire portion of a high molecule resin having a colorant, thereby providing a constant electrification amount to a particle.

To achieve these and other advantages and in accordance with the purpose of the present invention, as embodied and broadly described herein, there is provided a method for preparing particles for an electronic paper display device, in which a particle composed of a colorant and a high molecule resin comprises a charge controlling means.

The particle can further comprise an external additional material. The external additional material can further comprise a charge controlling means.

The particle composed of the high molecule resin or the external additional material can comprise a charge controlling means.

There is provided a method for preparing a particle comprising at least one functional group as the charge controlling means.

To achieve these and other advantages and in accordance with the purpose of the present invention, as embodied and broadly described herein, there is also provided a particle, comprising a colorant; a high molecule resin; and a charge controlling means.

The particle can further comprise an external additional material. Also, the external additional material can further comprise a charge controlling means.

The particle composed of the high molecule resin or the external additional material can comprise a charge controlling means.

There is provided a particle comprising at least one functional group as the charge controlling means.

In the present invention, problems generated as an amount of the conventional bulk-type charge controlling material added to prepare particles for an electronic paper display device is not proportional to an electrification amount of charged particles can be solved.

In the present invention, since the functional group is formed on a surface of the particle or an entire portion of the particle, the particle can have a desired electrification amount.

In the present invention, since an amount of a voltage necessary to the electronic paper display device can be predicted, a voltage control is facilitated. Also, when compared with the conventional method in which an amount of a charge controlling material has to be controlled so that particles for an electronic paper display device can have a certain electrification amount, the particles can be more easily prepared in the present invention. Also, in the present invention, it is easier for the particles to have a uniform electrification amount.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION

Figure 1:
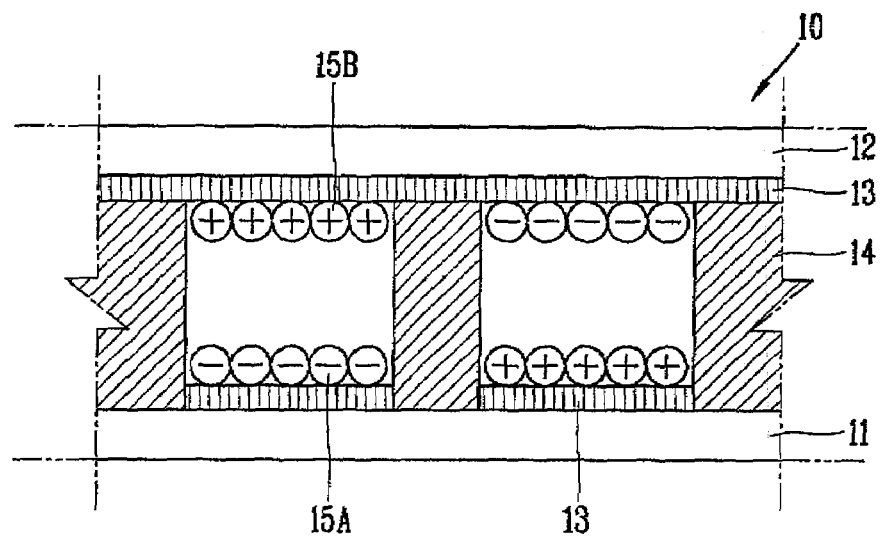
FIG. 1 is a schematic view showing a construction of an electronic paper display device in accordance with the conventional art.
Figure 2:
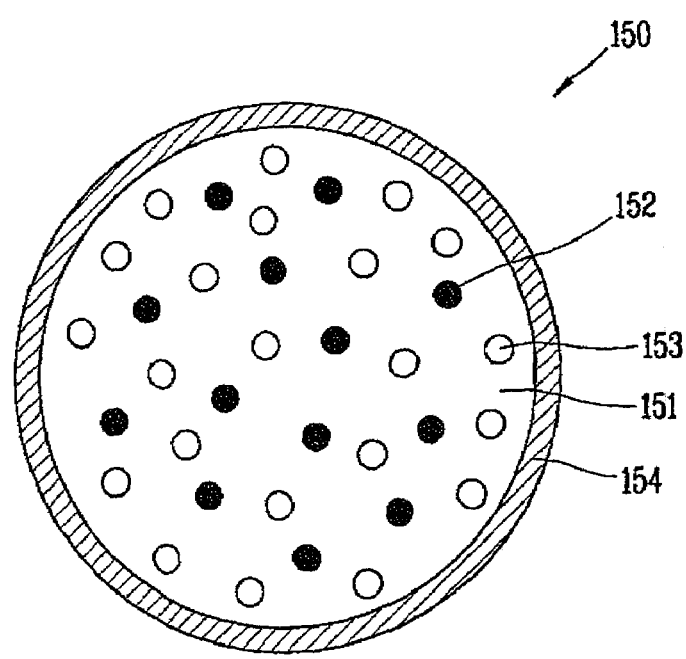
FIG. 2 is a mimetic diagram showing a structure of particles for the electronic paper display device in accordance with the conventional art.

Reference will now be made in detail to the preferred embodiments of the present invention, examples of which are illustrated in the accompanying drawings.

Hereinafter, particles for an electronic paper display device and a method for preparing the same will be explained in more detail.

In the method for preparing particles for an electronic paper display device, particles 200 and 200-1 have a uniform electrification amount.

The method for preparing particles for an electronic paper display device according to the present invention will be explained.

First, a colorant 200 having a certain color and a high molecule resin 210 are mixed with a certain ratio thereby to prepare a particle. The colorant and the high molecule resin may be mixed to each other by a polymerization method using a monomer.

As the high molecule resin of the present invention, poly methylmethacrylate, polystyrene, polyethylene terephthalate, etc. can be used.

A chemical formula of the high molecule resin is as follows.

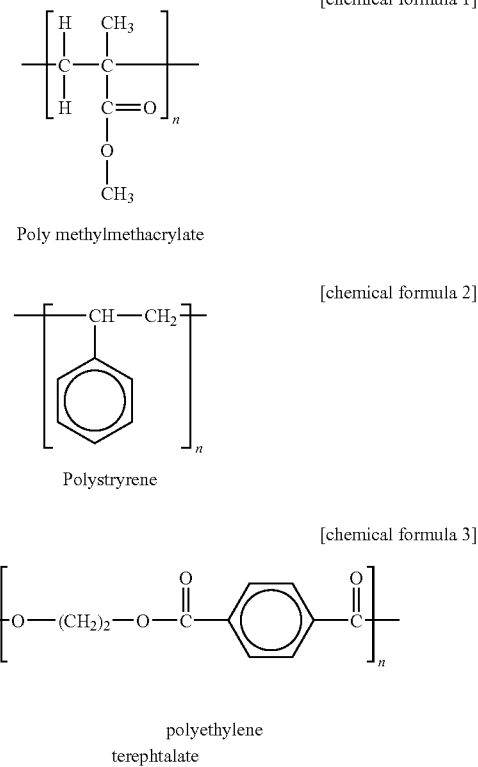

[chemical formula 1]

Poly methylmethacrylate

[chemical formula 2]

Polystryrene

[chemical formula 3]

polyethylene terephtalate

However, the high molecule resin of the present invention is not limited to the above examples, but can comprise all types of high molecule resins to which a charge controlling means 230 to be later explained is applied.

The charge controlling means 230 is applied to the particle 200 formed of a fine grain. As one method for applying the charge controlling means 230 to the particle 200, the charge controlling means 230 is simultaneously applied to the particle 200 at the time of forming the particle 200 and thereby the charge controlling means 230 is distributed on the entire region of the particle 200. According to the method, the charge controlling means 230 is simultaneously coupled to the high molecule resin 210 of the particle 200 when the particle 200 is formed, so that the charge controlling means 230 can be distributed on the entire region of the particle 200. The charge controlling means 230 is coupled to each molecule of the high molecule resin 210, so that the charge controlling means 23 can be evenly distributed on the entire region of the particle 200.

The charge controlling means 230 can be distributed at an outer periphery of the particle 200. In that case, the charge controlling means 230 is coupled to the outer periphery of the high molecule resin 210 at the time of polymerizing the high molecule resin 210. The charge controlling means 230 is coupled to the same material as the high molecule resin 210, and then a coating is performed on the high molecule resin 210. In another way, the charge controlling means 230 can be coupled to a material different from the high molecule resin 210, and then a coating is performed on the high molecule resin 210. It is also possible to form the charge controlling means 230 by polymerizing the high molecule resin 210 and then by modifying the surface of the high molecule resin 210.

According to the method for applying the charge controlling means 230 to the outer periphery of the high molecule resin 210, the charge controlling means 230 relevant to a substantial electrification amount is evenly distributed on the outer periphery of the high molecule resin 210. Accordingly, an electrification amount can be more easily controlled.

The charge controlling means 230 can be applied to an external additional material. That is, when an external additional material 240 applied onto a surface of the high molecule resin 210 is formed, the charge controlling means 230 is coupled to the external additional material 240. Then, the external additional material 240 is formed at the high molecule resin 210, thereby applying the charge controlling means 230 to the particle 200-1. In another way, the external additional material 240 is formed at the high molecule resin 210, and then the external additional material 240 is modified thereby to apply the charge controlling means 230.

As can be seen from the above explanation, the charge controlling means 230 is applied to the high molecule resin 210 or the external additional material 240, thereby more widely controlling a charge amount.

The charge controlling means 230 can be applied in various ways. The method for applying the charge controlling means 230 is not limited to the above examples, but can be variously implemented.

Hereinafter, the preferred embodiment will be explained in more detail.

As a concrete preferred embodiment of the charge controlling means 230, the functional group will be explained. That is, at least one functional group can be applied to the charge controlling means 230 by adding to the high molecule resin 210 and the external additional material 240.

Figure 3:
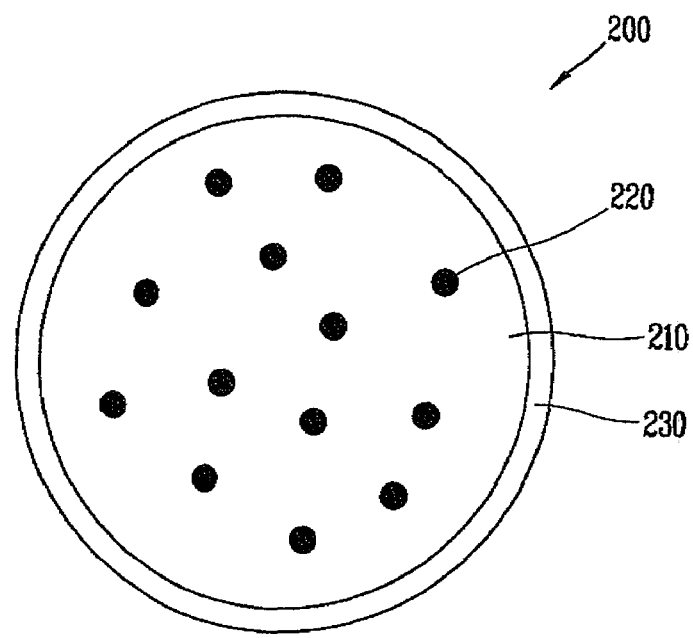
FIG. 3 is a mimetic diagram showing a structure of particles for an electronic paper display device according to a preferred embodiment of the present invention.

FIG. 3 shows a preferred embodiment of the charge controlling means 230, in which the functional group is formed on a surface of the high molecule resin 210.

The functional group 230 is formed on a surface of the particle 200 formed of fine grains. The functional group may be selected from a group including —COOH, —OH, —NH$_2$, and —SH. However, the present invention is not limited to the group.

As aforementioned, the functional group can be formed by modifying the surface of the particle.

At the time of modifying the surface of the particle, a particle having a colorant of one color and a high molecule resin and a particle having a colorant of another color and a high molecule resin may be modified so as to have each functional group having a different electron affinity.

As aforementioned, the functional group can be formed by modifying the high molecule resin 210, by simultaneously coupling the functional group to the high molecule resin 210 at the time of polymerizing the high molecule resin 210, or by a coating method. The functional group can be applied to the particles 200 and 200-1 by various methods.

A process for coupling COOH, one of the functional groups to the high molecule resin 210 formed of Poly methylmethacrylate (PMMA) will be explained as follows.

coupling reaction formula between PMMA and COOH

[chemical formula 4]

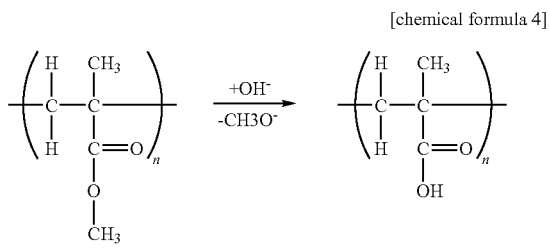

According to the above reaction, the PMMA to which the COOH is coupled has an electron affinity different from that of an PMMA to which another functional group is coupled that will be hereinafter explained, and thus is negatively charged at the time of a friction occurrence or a collision occurrence.

A process for coupling OH, one of the functional groups to the high molecule resin 210 formed of Poly methylmethacrylate (PMMA) will be explained as follows.

coupling reaction formula between PMMA and OH

[chemical formula 5]

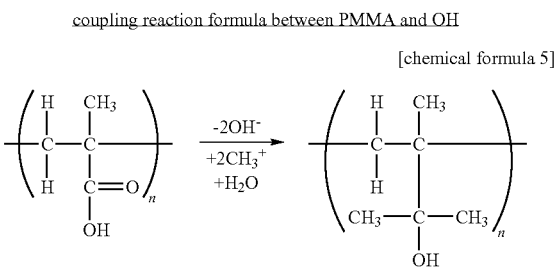

According to the above reaction, the PMMA to which the OH is coupled has an electron affinity different from that of the PMMA to which the aforementioned COOH is coupled, and thus is positively charged at the time of a friction occurrence or a collision occurrence.

That is, the COOH belongs to an electron-withdrawing functional group, and the OH belongs to an electron-donation functional group.

As the method for applying the functional group to the high molecule resin 210, a physical coupling method by using a mixer and a chemical coupling method by using a catalyst or a thermal reaction can be used.

Under a state that the particles 200 have different electron affinities, when the particles 200 collide to each other, the particle modified to have a functional group of a relatively large electron affinity is negatively charged and the particle modified to have a functional group of a relatively small electron affinity is positively charged.

As another example to form the functional group, a certain material having a functional group can be coated on the surface of the particle 200. The method for forming the functional group is not limited to the above method.

As another embodiment of the present invention, a step of forming an external additional material 240 after forming the functional group 230 can be further comprised.

More specifically, after the functional group 230 is formed on the surface of the high molecule resin 210 as the charge controlling means 230, the external additional material 240 is added to the surface of the functional group 230 so as to obtain an electrophoresis of the particle 200-1. The external additional material 240 can be coated on the surface of the functional group 230 by an apparatus such as a mixer, etc. As the external additional material 240, silica can be used.

As the first embodiment of the present invention, the external additional material 240 can be coupled to the external additional material 240 in order to apply the charge controlling means 230 to the particle 200-1. That is, the functional group can be coupled to a molecule of the external additional material 240. As another embodiment of the present invention, the external additional material 240 is formed at the high molecule resin 210, and then the external additional material 240 is modified thereby to be applied as the functional group. As still another embodiment of the present invention, a material having a functional group can be coated on the external additional material 240.

Besides the aforementioned methods, various methods for coupling the functional group to the high molecule resin 210 can be equally applied to the present invention.

When silica is used as the external additional material 240, a chemical formula of the silica to which COOH, one of the functional groups is coupled is as follows.

Chemical formula of Silica to which COOH is coupled

[chemical formula 6]

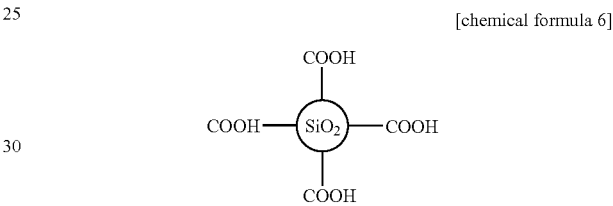

According to the above reaction, the silica to which the functional group is coupled has an electron affinity different from that of silica to which another functional group is coupled that will be hereinafter explained, and thus is negatively charged at the time of a friction occurrence or a collision occurrence.

A chemical formula of the silica to which OH, one of the functional groups is coupled is as follows.

Chemical formula of Silica to which OH is coupled

[chemical formula 7]

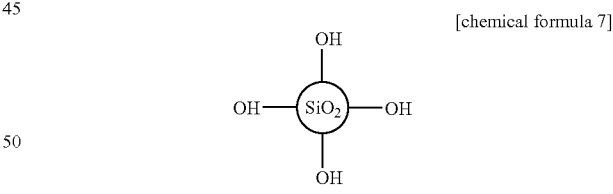

According to the above reaction, the silica to which the OH is coupled has an electron affinity different from that of the silica to which the aforementioned COOH is coupled, and thus is positively charged at the time of a friction occurrence or a collision occurrence.

That is, the COOH belongs to an electron-withdrawing functional group, and the OH belongs to an electron-donation functional group.

As the method for applying the functional group to the silica, a physical coupling method by using a mixer and a chemical coupling method by using a catalyst or a thermal reaction can be used.

Under a state that the particles 200-1 have different electron affinities, when the particles 200-1 collide to each other, the particle modified to have a functional group of a relatively large electron affinity is negatively charged and the particle modified to have a functional group of a relatively small electron affinity is positively charged.

Since the functional group can be coupled to the high molecule resin 210 or the external additional material 240, a charge amount can be more widely controlled.

The prepared particles 200 and 200-1 are contained in a space between upper and lower substrates, that is, in a plurality of pixels separated from each other by partition walls together with fluid having the same or similar density as/to the particles. The particles 200 and 200-1 prior to the containing are not charged yet. When the particles 200 and 200-1 are contained in the pixels, each particle 200 and 200-1 having a different electron affinity collides to each other thereby to be charged into a positive charge or a negative charge. After the particles 200 and 200-1 are contained in the pixels, each particle 200 and 200-1 that has not been charged yet collides to each other by an external force such as gravity or impact thereby to be electrified into a positive charge or a negative charge. The particles 200 and 200-1 that have been electrified into different charges are electrophoresed in different directions by a voltage applied to a transparent electrode.

Figure 4:
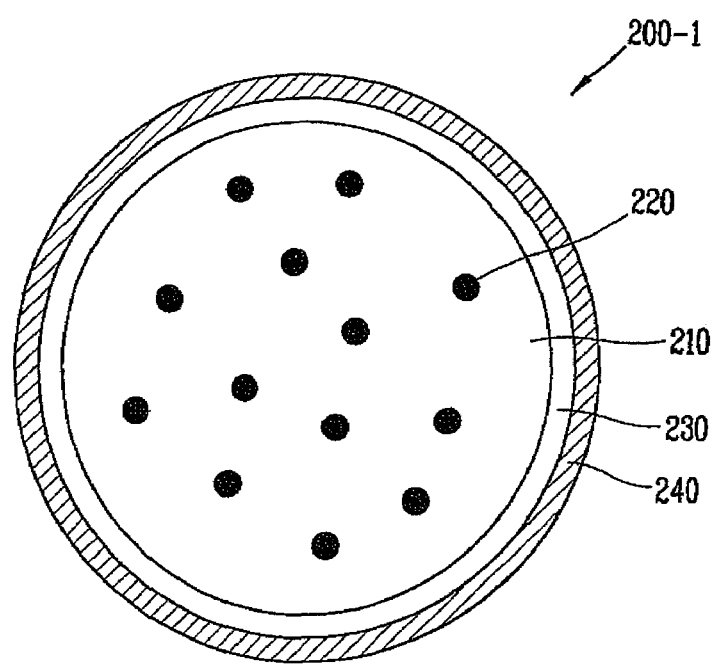
FIG. 4 is a mimetic diagram showing a structure of particles for an electronic paper display device according to another preferred embodiment of the present invention.

The prepared particles 200 and 200-1 for an electronic paper display device have a construction shown in FIGS. 3 and 4.

The particles 200 and 200-1 have the same construction as the construction aforementioned in the preparation method. A structure of the particles 200 and 200-1 will be schematically explained.

The particles 200 and 200-1 comprises a colorant 220, a high molecule resin 210, and a charge controlling means 230. The particles 200 and 200-1 can further comprise an external additional material 240 as aforementioned in the preferred embodiment.

The charge controlling means 230 applied to the particles 200 and 200-1 prepared as a fine grain form can be distributed on the entire region of the particles 200 and 200-1, or can be distributed on the outer periphery of the particles 200 and 200-1. The charge controlling means 230 can be applied to the surface of the high molecule resin 210 by a coating method or by modifying the high molecule resin 210.

When the charge controlling means 230 is formed on the surface or on the outer periphery of the high molecule resin 210, a charge amount can be more easily controlled.

As another embodiment for applying the charge controlling means 230, the external additional material 240 can comprise the charge controlling means 230.

The charge controlling means 230 can be included in the high molecule resin 210 or the external additional material 240, a charge amount can be more widely controlled.

As can be seen from the above embodiments, the charge controlling means 230 can be applied by various methods. That is, the charge controlling means 230 can be applied to the present invention not only by the above examples but also by various examples.

Hereinafter, preferred embodiments of the charge controlling means 230 will be explained.

First, the functional group will be explained as a preferred embodiment of the charge controlling means 230. That is, at least one of the functional groups is included in the high molecule resin 210 or the external additional material 240, thereby being applied as the charge controlling means 230.

FIGS. 3 and 4 show a state that the functional group is included on the surface of the high molecule resin 210.

The particles 200 and 200-1 prepared by the above method include a colorant 220 and a high molecule resin 210 therein.

A color of the colorant can be selected according to a product to which the electronic paper display device of the present invention is applied. That is, the color of the colorant may be white and black at the time of being applied to a mere book, etc. However, the color of the colorant may be red, blue, or green at the time of outputting a color image.

The functional group 230 is formed on the surface of the particles 200 and 200-1 including each colorant 220 of a different color. The functional group 230 can be set to have a different electron affinity according to particles having different colors. Preferably, when the particles have white and black, the functional groups thereof have a largest difference of an electron affinity. The functional group 230 is selected from a group including —COOH, —OH, —NH2, and —SH.

Besides the structures shown in FIGS. 3 and 4, the functional group can be distributed on the entire region of the high molecule resin 210 or can be formed on the outer periphery of the high molecule resin 210. Also, the functional group can be formed on the surface of the high molecule resin 210. Details of the minute structure of the functional group will be omitted since they are already aforementioned in the preferred embodiments.

As shown in FIG. 4, the external additional material 240 can be further formed on the surface of the functional group 230 in order to obtain an electrophoresis of the particles. For instance, charged particles float in a plurality of pixels, and particles having different charges are mixed to each other, which causes a bad influence on an electrophoresis of the particles. In order to solve the problem, the external additional material 240 may be formed on the surface of the functional group 230. As the external additional material 240, silica, etc. may be used.

In the first embodiment of the present invention, the functional group is included in the external additional material 240 so as to apply the charge controlling means 230 to the particles 200-1. Various methods for including the functional group into the external additional material 240 will be omitted since they are already aforementioned in the preferred embodiments.

Besides the above constructions, various constructions to couple the functional group to the high molecule resin 210 can be equally applied to the present invention.

Under a state that the particles 200-1 have different electron affinities, when the particles 200-1 collide to each other, the particle modified to have a functional group of a relatively large electron affinity is negatively charged and the particle modified to have a functional group of a relatively small electron affinity is positively charged.

Since the function group can be coupled to the high molecule resin 210 or the external additional material 240, a charge amount can be more widely controlled.

In the present invention, the particles do not include a charge controlling material. The particles can be prepared to have desired electrification capacities by forming each functional group selected from a group including —COOH, —OH, —NH$_2$, —SH, etc. having a different electron affinity on the surfaces of the particles or on the external additional material.

In the present invention, since an amount of a voltage necessary to the electronic paper display device can be predicted, a voltage control can be more easily controlled. That is, in the present invention, the conventional problem generated as an added bulk-type charge controlling material is not proportional to an electrification amount of charged particles can be solved.

Also, the particles for an electronic paper display device according to the present invention can be more easily prepared than in the conventional method in which an amount of a charge controlling material has to be controlled so that particles can have a certain electrification amount. Furthermore, in the present invention, it is easier for the particles to have a uniform electrification amount.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. A method for preparing charged particles for an electronic paper display device, comprising:
   forming a particle by mixing a colorant and a resin, wherein the resin is formed before mixing or is formed during mixing by polymerization;
   applying a charge controlling material comprising a functional group such that the charge-controlling material is distributed at an outer periphery of the particle, wherein the charge controlling material is applied by coating the functional group on the particle or by coupling the functional group to the resin during the polymerization; and
   applying an additional material to the charge controlling material.

2. The method of claim 1, wherein the charge controlling material is applied by coating the functional group on the particle.

3. The method of claim 1, wherein the the charge controlling material is applied by coupling the functional group to the resin during the polymerization.

4. The method of claim 1, further comprising selecting the functional group from a group including —COOH, —OH, —NH$_2$, and —SH.

5. The method of claim 4, wherein the functional group comprises a multiple-functional group wherein each functional group of the multiple-functional group comprises a different electron affinity.

6. The method of claim 1, wherein applying the additional material includes applying silica.

7. The method of claim 1, wherein the polymerization is monomer polymerization, such that the resin is formed during mixing by monomer polymerization, and the charge controlling material is applied by coupling the functional group to the resin during the monomer polymerization.

8. The method of claim 1, wherein the colorant has a first color and a second color to be applied to each particle and the first color and the second color are different from each other.

9. The method of claim 1, wherein the resin is formed before mixing.

10. The method of claim 1, wherein the resin is formed during mixing by polymerization.

11. Charged particles for an electronic paper display device, comprising:
    a particle comprising a colorant and a resin;
    a charge controlling functional group layer distributed at an outer surface of the particle; and
    an additional material on the functional group layer.

12. The charged particles of claim 11, wherein the functional group is one of a group including —COOH, —OH, —NH$_2$, and —SH.

13. The charged particles of claim 11, wherein the additional material is silica.

* * * * *